Feb. 19, 1935.　　　D. E. AUSTIN　　　1,991,535
AUTOMOBILE BODY STRUCTURE
Filed Nov. 20, 1929　　　4 Sheets-Sheet 2
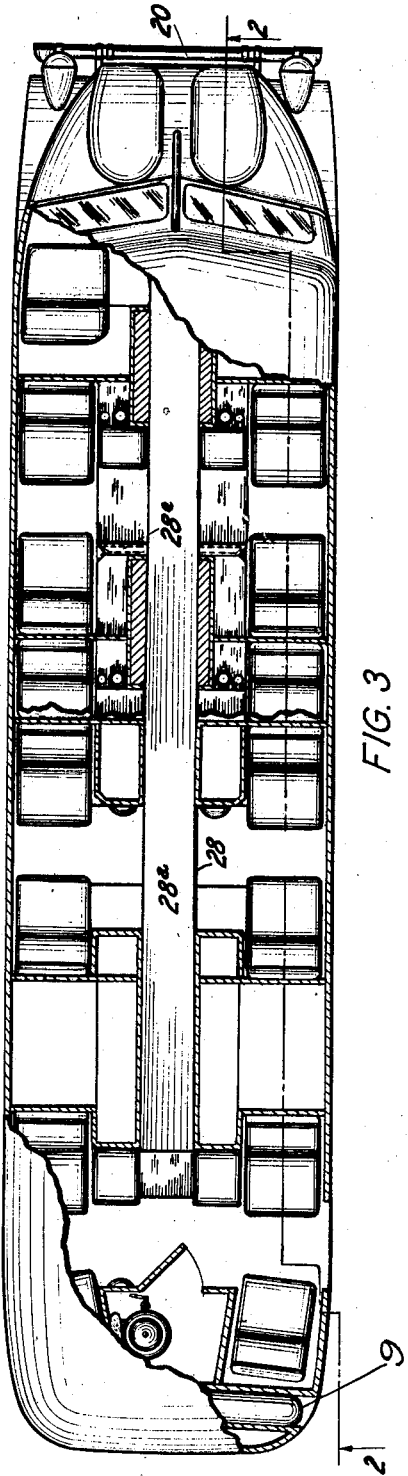
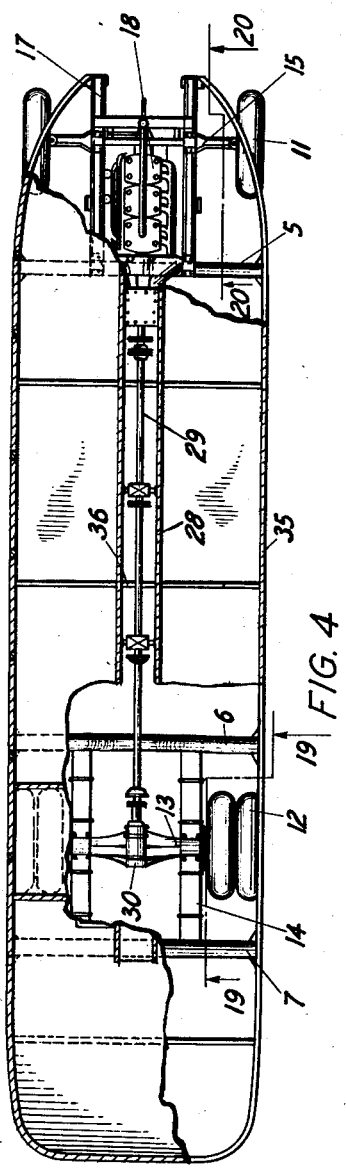
INVENTOR.
DWIGHT E. AUSTIN
BY A. B. Bowman
ATTORNEY

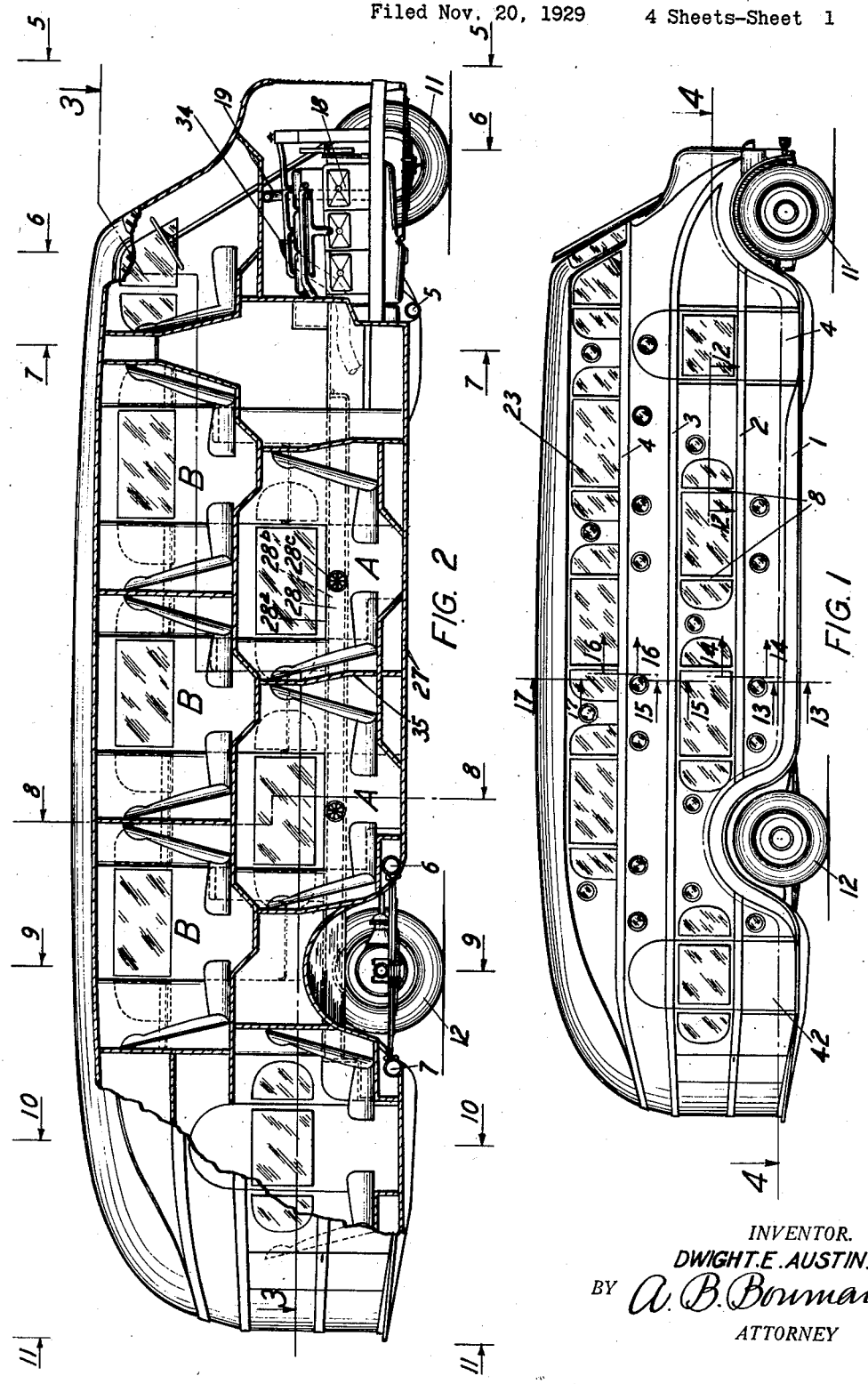

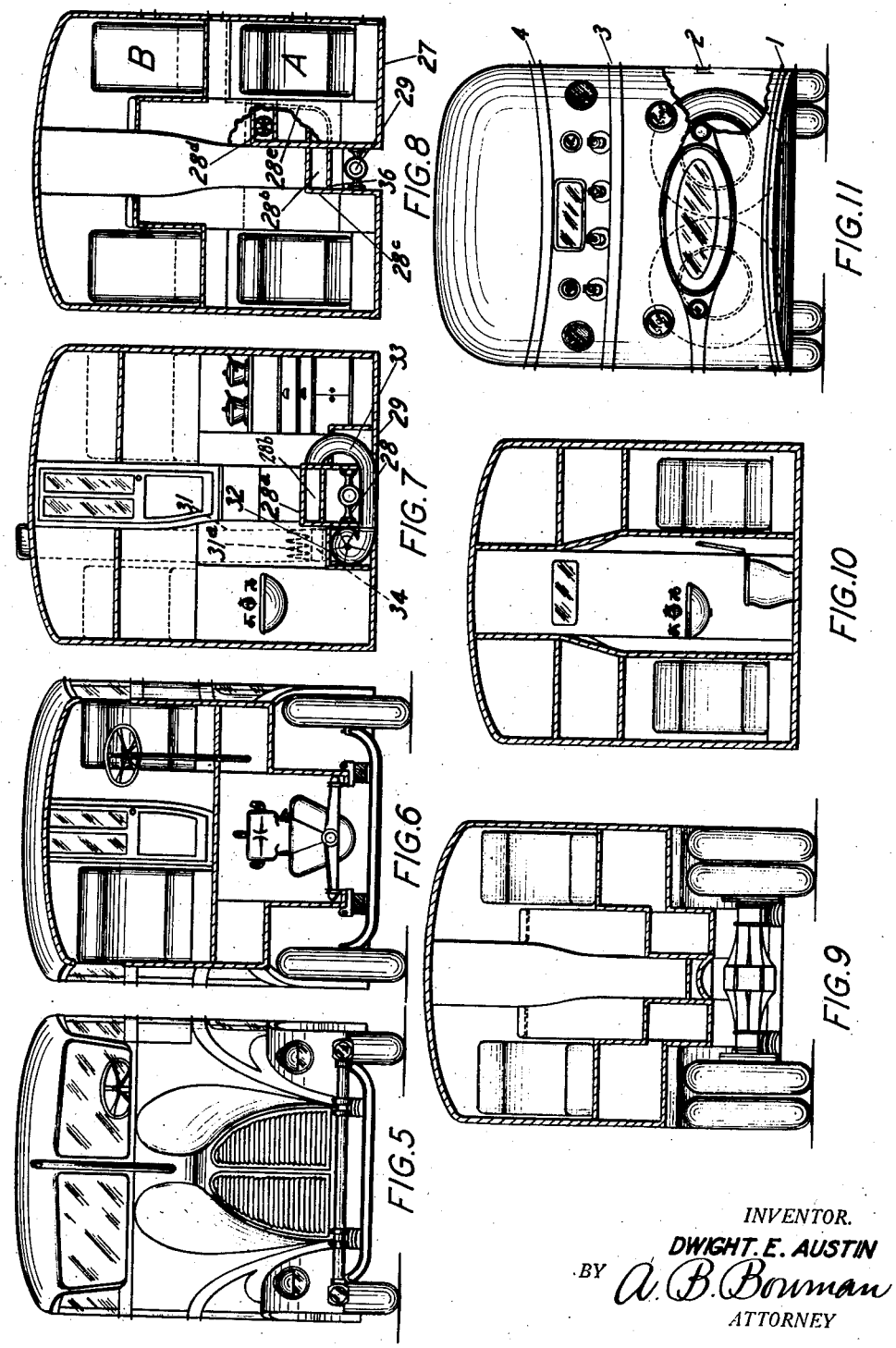

Feb. 19, 1935.     D. E. AUSTIN     1,991,535
AUTOMOBILE BODY STRUCTURE
Filed Nov. 20, 1929     4 Sheets-Sheet 4
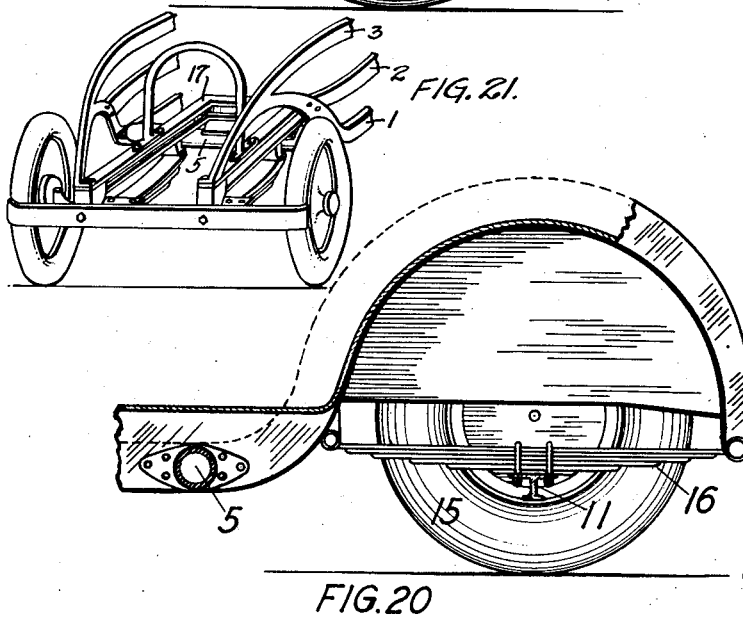
INVENTOR
DWIGHT E. AUSTIN.
BY
A. B. Bowman
ATTORNEY Patented Feb. 19, 1935

1,991,535

UNITED STATES PATENT OFFICE 1,991,535

AUTOMOBILE BODY STRUCTURE

Dwight E. Austin, Los Angeles, Calif., assignor, by mesne assignments, to General Motors Truck Corporation, Pontiac, Mich., a corporation of Delaware Application November 20, 1929, Serial No. 408,481

8 Claims. (Cl. 296—28)

My present invention relates to automobile body structures, particularly bodies for automobile stages, or other large passenger or freight carrying vehicles.

The objects of this invention are: first, to provide a body for vehicles in which the body is extended downwardly as close as possible to the roadway so as to provide as low a center of gravity as possible and as great a capacity as possible, and which will permit the location of compartments as low as possible so that the overall height of the body is not practically excessive even though a double deck structure is made; second, to provide a structure of this class in which the supporting framework of the body, instead of being positioned below the body and above the axles as in conventional construction of this class, is positioned at the sides or lateral contour of the body for not only supporting the body portion relative to the wheels at the outer sides thereof, but also providing a structure and reinforcing therefor of considerable strength longitudinally, transversely, and elevationally, so that the body portion or enclosure, and the passenger and freight compartments therein, are positioned within a very rigid frame, thus increasing the carrying capacity or available space to a maximum, and also increasing the safety of the occupants or freight to a considerable extent over former structures in case of collisions or other accidents; third, to provide a vehicle body structure of this class in which the supporting framework forms a part of the body, thus further increasing the available space, the compactness and strength of all parts; fourth, to provide a structure of this class in which the main supporting members extend slightly beyond the outer surfaces of the panels of the body structure, forming guard rails or protecting means therefor; fifth, to provide a structure of this class in which the main supporting frame comprises a plurality of superimposed longitudinally extending rigid frame members extending substantially continuously around the body; sixth, to provide a structure of this class in which the several longitudinally extending frame members are efficiently and rigidly reinforced relative to each other and relative to those at the opposite sides of the body; seventh, to provide a frame for a structure of this class in which the frame extends substantially flush or beyond the outer sides of the wheels and also over the same and below the axes thereof as a continuous frame, and a frame in which the carrying capacity is increased to its lateral limits; eighth, to provide novel means for rigidly reinforcing the frame transversely; ninth, to provide a continuous frame from end to end and at the outer side of the body in which openings are provided in the sides of the body without materially affecting the strength of the frame; tenth, to provide a novel engine mounting in a frame of a body of this class; eleventh, to provide a supporting frame for a body of this class in which is provided a tire casing forming a part of the body, for housing and protecting tires without taking up material space; twelfth, to provide a novel means for mounting the vehicle springs on the frame of a body of this class; thirteenth, to provide a novel body of this class for double-deck passenger vehicles in which the seats on both decks are accessible from a common raised aisle at the central portion of the body, the raised portion of the body forming the aisle providing space beneath the same and above the bottom level of the body for the drive shaft connecting the engine at one end with the drive wheels at the opposite end, the raised portion forming the aisle also reinforcing the body transversely above the bottom of the body; fourteenth, to provide a body of this class having a central tunnel forming a raised aisle, the tunnel forming an air duct for conducting air to the various passenger compartments at the opposite sides thereof and above and below the same, said tunnel also reinforcing the body transversely above the bottom thereof; and, fifteenth, to provide as a whole a novelly constructed body of the class mentioned, and one which is simple and economical of construction proportionate to its many advantages, and one which will not readily deteriorate.

With these and other objects in view as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a side elevational view of an automobile stage embodying my new vehicle body structure; Fig. 2 is a longitudinal sectional elevational view thereof on a slightly enlarged scale with the section taken on the line 2—2 of Fig. 3; Fig. 3 is a partial plan and partial sectional view thereof taken at 3—3 of Fig. 2; Fig. 4 is a sectional view thereof in plan taken at 4—4 of Fig. 1, showing a portion of the floor of the body broken away to facilitate the illustration; Fig. 5 is a front elevational view thereof; Figs. 6, 7, 8, 9 and 10 are transverse sectional views thereof, taken respectively on the lines 6—6, 7—7, 8—8, 9—9 and 10—10 of Fig. 2. Fig. 11 is a rear elevational view thereof; Fig. 12 is a fragmentary sectional view of the body on an enlarged scale taken at 12—12 of Fig. 1, showing a horizontal section through a portion of the wall of the body structure; Figs. 13, 14, 15, 16 and 17 are fragmentary sectional views on an enlarged scale, taken respectively at 13—13, 14—14, 15—15, 16—16 and 17—17 of Fig. 1, showing vertical sections through the side walls of the body structure; Fig. 18 is a fragmentary sectional view taken through 18—18 of Fig. 13 showing a portion of the roof or top of the body; Fig. 19 is a fragmentary sectional view on an enlarged scale taken at 19—19 of Fig. 4, showing the mounting of the rear vehicle springs on transverse members of the frame of the body; and, Fig. 20 is a fragmentary sectional view on an enlarged scale showing the construction of the front of the body and the mounting of the front vehicle springs on the frame thereof. Fig. 21 is a perspective view of a portion of the front end of the body frame.

Like characters of reference refer to similar parts and portions throughout the views of the drawings.

The frame of my new body structure for vehicles, as illustrated in the drawings, consists of a plurality of longitudinally extending frame members 1, 2, 3 and 4, at the sides of the body, and a plurality of transverse frame members 5, 6 and 7. The frame members 1, 2, 3 and 4 are preferably in the form of fabricated channels, as shown in Figs. 13, 14, 15 and 16, and are positioned at the extreme lateral sides of the body and form a part of the side walls thereof. Said frame members extend outwardly from the inner sides of the side walls and extend preferably outwardly from the outer sides of the side walls, forming not only supporting means for the body, but also guard rails therefor at various portions from the bottom to the top of the body. The frame members 1, 2, 3 and 4 at the opposite sides of the body are arranged in parallel and superimposed relation and converge and are rigidly secured relative to each other at their forward ends, thus tieing the frame members rigidly together at their forward ends. These frame members 1, 2, 3, and 4 are spaced and tied together vertically by vertical frame members 8 at close intervals from front to rear. All of the frame members 1, 2, 3 and 4 extend around the rear end of the body, the members 1, 3 and 4, in this instance, extending completely around and are connected at their rear ends forming substantially U-shaped frame members extending around the lateral sides and rear end. Forwardly of the rear end of the body is a spare tire storing compartment 9 having openings through the side walls, thereof, said openings dividing the frame members 2, as shown in Fig. 3. The other frame members 1 and 3 extending completely around the rear end of the body provide protection for the tires.

The outer lateral sides of the body, and therefore the frame members 1, 2, 3 and 4 which form a part of the side walls of the body, are positioned substantially flush or slightly outwardly from the outer sides of the wheels of the vehicle, as shown in Figs. 5, 6, 9 and 11. The lower frame members 1 which form the main supporting frame member for the body are positioned as close to the ground or roadway as possible, but are bent over and clear of the wheels, thus forming a frame member extending continuously from end to end of the vehicle and around the rear end.

The transverse frame members 5, 6 and 7, in this instance, consist of large tubes which are secured at their ends to the inner sides of the lower frame member 1, as shown in Figs. 2 and 4. The transverse frame member or tube 5 is positioned behind the front wheels 11 and is preferably at the portions of the frame members 1 where the same are bent upwardly over the front wheels. The tubes 6 and 7 are positioned in this instance immediately forwardly and backwardly from the rear wheels 12 and are preferably positioned below the enclosure of the body but preferably above the lower limits of the frame members 1.

The rear wheels 12 are mounted on the axle housing 13 which is secured intermediate its ends to and intermediate the ends of leaf springs 14 which extend longitudinally with respect to the vehicle body at the opposite sides of the median line thereof and are pivotally connected at their forward and rear ends to the tubular frame members 6 and 7, as shown best in Figs. 4 and 19.

The front axle 15 on which the front wheels 11 are mounted is secured intermediate its ends to and intermediate the ends of front vehicle springs 16 which are also leaf springs extending longitudinally with respect to the vehicle and are positioned at the opposite sides of the median line thereof. The rear ends of the springs 16 are pivotally supported with respect to the transverse frame member 5 and are pivotally supported at their forward ends on the forward ends of the longitudinal frame members which converge at their forward ends. It will be here noted that the forward ends of the frame members at the opposite sides of the body also converge with each other and to such extent that the forward ends of the longitudinal frame members are in substantially vertical alignment with the springs, while the rear ends of the springs 16 are positioned a considerable distance inwardly toward the median line of the vehicle from the outer sides of the body.

At the forward end of the vehicle body is mounted a U-shaped engine supporting frame 17 with its open end toward the front of the body. The legs of the U-shaped frame 17 extend longitudinally with respect to the longitudinal axis of the body and terminate at their forward ends and are secured at their forward ends to the forward ends of the longitudinal members at substantially their point of convergence. The rear end of the engine supporting frame 17 is positioned above and is preferably supported on the transverse frame member 5. The forward end of the engine supporting frame 17 is open so that an engine may be easily slipped into place from the forward end of the body. The separated forward ends of the longitudinal frame members and also of the engine supporting frame may be reinforced with respect to each other by an arch member 19, as shown in Fig. 2, and by a removable bumper 20 at the forward end thereof, as shown in Fig. 3.

The spaces between the several frame members are enclosed by suitable walls, those at the sides consisting preferably of inner panels 21 secured to the inner sides of the frame members 1, 2, 3, 4 and 8, and outer panels 22, joined to the frame members, there being provided windows 23 in the walls and between the frame members to suit the desired arrangement of compartments within the body.

The roof or top of the body may be constructed similar to the side walls thereof between arched frame members 24, as shown in Figs. 17 and 18; or the spaces between the arched frame members 24, forming the contour for the roof, may be filled in with wood panels 25 covered with sheet metal or a fabric covering 26.

The space within the frame and the side walls supported thereby forms a spacious enclosure extending to the lateral limits of the body and substantially from end to end. The compartments within the enclosure of the body extend also from the top to the floor panel 27 which is substantially flush with a lower edge or portion of the lower side frame member 1, as shown best in Figs. 8 and 13. The lower side of the frame member 1 is located as close as possible to the ground and preferably below the horizontal axes of the wheels so as to lower the center of gravity of the body of the vehicle as much as possible and to lower the overall height, particularly when a double-deck vehicle is made.

The body shown is a double-deck passenger automobile stage having lower and upper tiers of compartments and seats in each of the compartments. Each of the compartments is accessible from a central aisle, the floor 28a of which is positioned approximately half way between the floors of the lower compartment A and the upper compartment B. The floor 28a of the aisle is arranged at the top side of the raised portion or tunnel 28 which forms a separation between the lower compartment A positioned at the opposite sides thereof. The drive shaft 29 which connects the engine 18 to the differential housing 30 on the rear axle casing extends longitudinally through the lower portion of the raised portion or tunnel 28, as shown best in Figs. 2, 4, 7 and 8. At the upper portion of the tunnel and immediately below the floor 28a of the aisle is a duct 28b from which ventilating and heating air is supplied through openings 28c to the lower compartment and openings 28d to the upper compartment, the openings 28d being at the upper ends of short ducts 28e extending upwardly from the sides of the duct 28b, as shown in Figs. 3 and 8.

The ventilating air may be supplied to the duct 28b by a duct 31 extending from the top of the vehicle body to the bottom thereof from which it may be forced by a blower 32 through a duct 33 into the duct 28b. In the duct 31 may be a heating means 31a for heating the air. Or hot air may be supplied from a conductor 34 to the duct 31, as shown in Figs. 2 and 7, the conductor 34 receiving heated air from the exhaust of the engine, not shown.

The compartments in the lower deck at the opposite sides of the longitudinal aisle are divided into smaller passenger compartments by transverse partitions 35 which extend from the outer side wall to the central raised portion or tunnel 28, thus reinforcing the side walls of the body with respect to the central raised portion and also relative to each other. It will be noted that the side walls of the raised portion or tunnel may be also reinforced with respect to each other by transverse partitions 36, shown best in Figs. 4 and 8, said partitions 36 being preferably in alignment with the partitions 35. Thus, the outer side walls of the body are further reinforced with respect to each other.

It will be noted that the longitudinal frame members 1 are further reinforced transversely with respect to each other by plates 37, shown best in Fig. 19, said plates 37 being positioned at a slight angle to the vertical plane and secured at the lateral edges to the frame members 1 at the portion thereof where the same extend over the rear wheels.

Entrance and exit may be had to the body of the vehicle at the forward and rear ends through doorways closed normally by the doors 41 and 42.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention what I claim as new and desire to secure by Letters Patent is:

1. In a vehicle body, a combined covering and reinforcing frame means constituting the major exterior portion of said vehicle body, said means comprising alternately disposed longitudinally extending bands of covering elements and frame elements and a plurality of outwardly projecting guard rails formed at the junctures of said frame elements and said covering elements.

2. In a vehicle body, a combined covering and reinforcing frame means constituting the major exterior portion of said vehicle body, said means comprising alternately disposed longitudinally extending bands of covering elements and frame elements and a plurality of outwardly projecting guard rails formed at the junctures of said frame elements and said covering elements, the lowermost frame element delineating the lower margin of said vehicle body and forming the chassis frame therefor, said lowermost frame element including upwardly directed semi-circular portions forming wheel receiving means.

3. In a vehicle body, a combined covering and reinforcing frame means constituting the major exterior portion of said vehicle body, said means comprising alternately disposed longitudinally extending bands of covering elements and frame elements, a plurality of outwardly projecting guard rails formed at the junctures of said frame elements and said covering elements, several of said frame elements on each side of said vehicle body converging and joining each other at the forward end of said vehicle body.

4. In a vehicle body, a combined covering and reinforcing frame means constituting the major exterior portion of said vehicle body, said means comprising alternately disposed bands of covering elements and frame elements extending along the sides and around the rear of said vehicle body, and a plurality of superposed guard rails formed at the junctures of said covering elements and said frame elements.

5. In a vehicle body, a group of longitudinally extending generally spaced frame members positioned in superimposed relation at opposite sides of the body, the members of each group converging and joining each other at their forward ends, means connecting the group of frame members across the forward end portion of the body, said means comprising a rigid frame extending inwardly from the end of the groups of frame members, and also a transverse tie member below the frame and at the forward end portion of the group of frame members.

6. In a vehicle body, a group of longitudinally extending frame members positioned in superimposed relation at the opposite sides of the body, the members of each group converging vertically and joining each other at their forward ends, the groups of frame members at the opposite sides of the body being inturned toward but spaced from each other at their forward ends.

7. In a vehicle body, a group of longitudinally extending frame members positioned in superimposed relation at the opposite sides of the body, the members of each group converging and joining each other at their forward ends, the groups of frame members at the opposite sides of the body being inturned toward but spaced from each other at their forward ends, a U-shaped rigid frame mounted between the laterally spaced apart groups of frame members at their forward ends with the legs of the U-shaped frame extending longitudinally and rigidly secured to the inturned portions of said groups of frame members, and tie rod means connecting the end portions of said groups of frame members below said frame.

8. In a vehicle body, a group of longitudinally extending generally spaced frame members positioned in superimposed relation at each side of the body and defining the opposite side walls thereof, members of each group converging in said wall and joining each other at their forward ends, and means connecting the group of frame members across the forward end portion of the body.

DWIGHT E. AUSTIN.